UNITED STATES PATENT OFFICE.

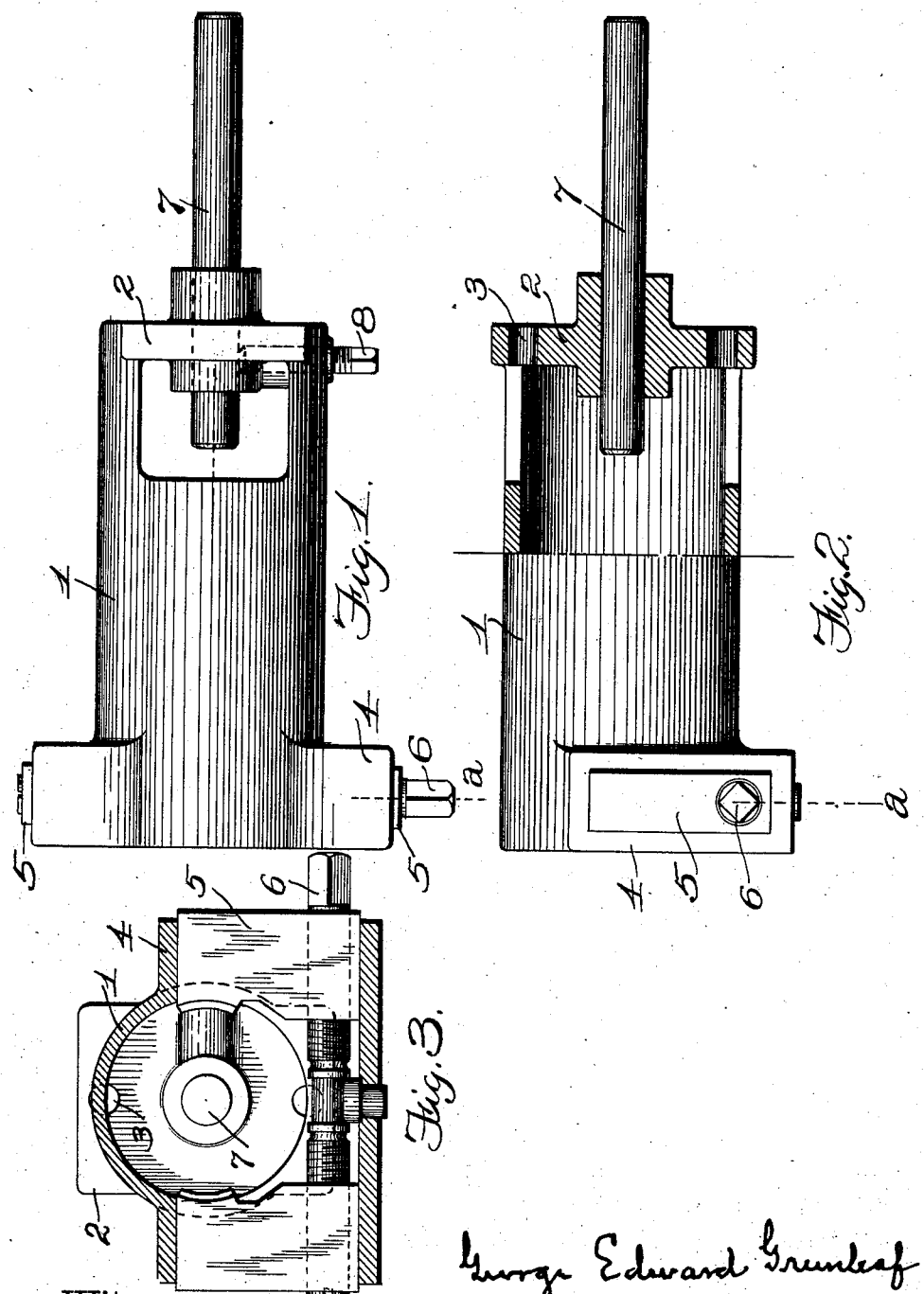

GEORGE EDWARD GREENLEAF, OF PLAINFIELD, NEW JERSEY, ASSIGNOR TO NILES-BEMENT-POND COMPANY, OF JERSEY CITY, NEW JERSEY.

LATHE APPLIANCE.

1,021,771. Specification of Letters Patent. Patented Apr. 2, 1912.

Application filed July 11, 1910. Serial No. 571,320.

*To all whom it may concern:*

Be it known that I, GEORGE EDWARD GREENLEAF, a citizen of the United States, residing at Plainfield, Union county, New Jersey, have invented certain new and useful Improvements in Lathe Appliances, of which the following is a specification.

In hollow spindle lathes the bar to be worked upon is projected through the chuck a proper distance and, after the work has been done upon the projecting end of the bar, the finished work is cut off, the chuck opened, and the bar pushed forward again and the chuck tightened. This operation requires, in the case of large bars, as distinguished from light rods and wire, that the operator shall go around to the head end of the lathe in order to push the bar through the chuck. In small machines, like screw machines, the spindles are often provided with an automatic wire feed for advancing the wire or rod after each cutting off of the work. In turret lathes the wire or bar is arranged to be projected, at each setting, an accurate given distance from the chuck, this distance being determined by a stop carried by the turret and taking proper arresting position for the bar when the turret carriage is moved toward the chuck and against its limiting stop. All of the above is usual and ordinary. In some of the modern turret lathes provision is made for acting on very large and heavy bars, five or six inches in diameter, for instance, and these are difficult to handle by hand.

My present invention provides for mechanically dealing with the bar when arranging for its projection from the lathe-chuck and for the adjustment of the degree of that projection.

My invention will be readily understood from the following description taken in connection with the accompanying drawing in which:—

Figure 1 is a plan of a lathe-appliance exemplifying my present invention: Fig. 2 a side elevation, part vertical longitudinal section, of the same: and Fig. 3 a vertical transverse section in the plane of line *a* of Figs. 1 and 2.

In the drawing:—1, indicates a gripper-body illustrated as having the form of a tube open at its front end and having a bore adapted to freely receive the end of any bar to be dealt with: 2, a flange at the rear end of the gripper-body: 3, bolt-holes in this flange, this bolting flange forming typical means for securing the gripper-body to a lathe-turret, in case the device is to be used on a turret lathe: 4, transverse jaw-sockets carried by the front end of the gripper-body: 5, gripper-jaws mounted in the sockets and adapted to slide to and from the axis of the gripper-body: 6, a screw engaging the two jaws and adapted to force them toward each other: 7, a stop-rod mounted in and arranged to slide axially in the rear end of the gripper-body: and 8, a set-screw for securing this stop-rod in position of longitudinal adjustment.

Assume a turret lathe in which one piece of work has been completed and cut from the bar, thus calling for a new and measured projection of the bar. The lathe-chuck is to be opened to release the bar; jaws 5 are to be opened sufficiently to freely admit the bar; the turret is to be turned to bring the appliance in line with the bar; the turret-slide is to be moved toward the chuck so that the gripper will pass over the end of the bar; the gripper-jaws are to be tightened on the bar; the turret-slide is to be retreated, dragging the bar with it such distance as to insure more than enough projection of the bar from the chuck; the gripper-jaws are to be released from the bar; the turret is to be again moved toward the lathe-chuck till arrested by the usual turret-stop; the end of the stop-bar engages the end of the work-bar and pushes it back into the lathe-chuck; the lathe-chuck is then to be tightened on the bar; the turret is then to be retreated. This leaves the work-bar projecting from the lathe-chuck an accurate predetermined distance as determined by the adjustment of stop-bar 7, which adjustment will be made to suit the work in hand. In this operation, the dragging of the work-bar out of the chuck may be effected by the usual turret-sliding devices, such usual turret-sliding devices consisting of cap and pinion and capstan and wheel arrangements in most turret lathes, supplemented, in some cases, by power mechanism for fleeting the turret away from the lathe-chuck. The particular construction illustrated is to looked upon as being merely a single exemplification of my invention. It represents the best form in which I at present contemplate embodying my invention.

I claim:—

1. A lathe appliance comprising, a tubular body having a head at the rear end, lateral housings at the front end, gripping jaws slidable laterally within the housings, a double screw to move the jaws, a centering device for the screw, a stop adjustably passing through the rear head, and means for securing said stop in adjusted position.

2. In a lathe appliance, the combination of a tubular body having a head at the rear end, the head being adapted for fastening to a turret member, a rod passing through the head constituting a stop, means for clamping the stop in adjusted position, housings at the sides of the front end of the body, slidable blocks in the housing having clamping jaws opposite the axis of the body, and having bases outside of the circular limits of the body, a double screw engaging threaded bores in said bases, a centering device carried by the body for holding the screw axle stationary, and the screw being provided with an angular portion for turning the screw.

GEORGE EDWARD GREENLEAF.

Witnesses:
 GEO. B. WEAN,
 C. M. BEILER.

Copies of this patent may be obtained for five cents each, by addressing the "Commissioner of Patents, Washington, D. C."